United States Patent [19]
Tsunoda et al.

[11] Patent Number: 5,424,094
[45] Date of Patent: Jun. 13, 1995

[54] METHOD FOR PREPARING MAGNETIC RECORDING MEDIUM

[75] Inventors: Eizo Tsunoda; Kaoru Kawasaki; Akihiko Seki; Kazuyuki Shimazaki, all of Nagano, Japan

[73] Assignee: TDK Corporation, Tokyo, Japan

[21] Appl. No.: 265,106

[22] Filed: Jun. 24, 1994

[30] Foreign Application Priority Data

Jun. 25, 1993 [JP] Japan ................................. 5-179766

[51] Int. Cl.$^6$ ............................................. H01F 10/02
[52] U.S. Cl. ..................................... 427/128; 428/900
[58] Field of Search .......................... 427/128; 428/900

[56]    References Cited
FOREIGN PATENT DOCUMENTS

| | | |
|---|---|---|
| 64-79274 | 3/1989 | Japan . |
| 64-79275 | 3/1989 | Japan . |
| 2-107674 | 4/1990 | Japan . |
| 2-178363 | 7/1990 | Japan . |
| 2-178364 | 7/1990 | Japan . |
| 3-22220 | 1/1991 | Japan . |
| 4-176020 | 6/1992 | Japan . |

*Primary Examiner*—Bernard Pianalto
*Attorney, Agent, or Firm*—Oblon, Spivak, McClelland, Maier & Neustadt

[57]                ABSTRACT

A mixture containing a magnetic powder, a binder, and an organic solvent is kneaded by passing it through a twin-shaft continuous kneader while the shearing force applied to the mixture is varied by changing the set angle of paddles used. The temperature of the mixture is controlled to be higher than Tg and lower than the boiling point of the organic solvent when it passes through the maximum shearing force zone, and to be lower than the temperature of the mixture upon its passage through the maximum shearing force zone, preferably lower than Tg when it passes through zones other than the maximum shearing force zone. There is obtained a magnetic recording medium which has improved dispersion of magnetic powder and excellent electromagnetic properties as well as a low coefficient of friction and improved transport stability.

4 Claims, 4 Drawing Sheets

METHOD FOR PREPARING MAGNETIC RECORDING MEDIUM

BACKGROUND OF THE INVENTION

1. Field of the Invention

This invention relates to a method for preparing magnetic recording media such as magnetic tapes and magnetic discs.

2. Prior Art

For the manufacture of magnetic recording media having a coated magnetic layer, it is known to prepare the magnetic paint used therein by using a twin-shaft continuous kneader for applying high shear forces to a mixture of a magnetic powder, binder and organic solvent at a high solids concentration for dispersing the mixture.

As compared with the use of a batchwise kneader, for example, the use of a twin-shaft continuous kneader for the preparation of a magnetic paint offers high productivity, but a short kneading time because of continuous kneading operation. As a result, there is a frequent likelihood that kneading become insufficient and the dispersion of magnetic powder become poor, failing to provide satisfactory electromagnetic properties.

Then Japanese Patent Application: Kokai (JP-A) No. 176020/1992 proposes to knead a mixture at a temperature which is higher than the glass transition temperature (Tg) of the binder used and lower than the boiling point of the organic solvent used. This proposal ensures improved dispersion of magnetic powder and satisfactory electromagnetic properties, but is difficult to control the surface roughness of a magnetic recording medium prepared therefrom, with an improvement in surface profile entailing an increased coefficient of dynamic friction, often inviting a failure such as an accidental transport interruption. Although it is envisaged to reduce such conditions as the pressure and temperature of super-calendering as means for controlling surface roughness, undesirably this can often incur losses of high-frequency range output and C/N.

DISCLOSURE OF THE INVENTION

A primary object of the present invention is to provide a method for preparing a magnetic recording medium by kneading a magnetic paint in a twin-shaft continuous kneader, the magnetic recording medium having improved dispersion of magnetic powder and excellent electromagnetic properties as well as a low coefficient of friction and improved transport stability.

This and other objects are achieved by the present invention which is defined below as (1) to (4).

(1) A method for preparing a magnetic recording medium by passing a mixture containing a magnetic powder, at least one binder, and at least one organic solvent through a twin-shaft continuous kneader for kneading to form a magnetic paint and coating a substrate with the magnetic paint, the shearing force applied to said mixture being passed through said twin-shaft continuous kneader is varied, and the temperature of said mixture is controlled to be higher than the glass transition temperature of said at least one binder and lower than the lowest boiling point of said at least one organic solvent when said mixture passes through the zone of a maximum shearing force, and the temperature of said mixture is controlled to be lower than the temperature of said mixture upon its passage through the maximum shearing force zone at least partially when said mixture passes through zones other than the maximum shearing force zone.

(2) A method for preparing a magnetic recording medium according to (1) wherein the temperature lower than the temperature of said mixture upon its passage through the maximum shearing force zone is lower than said glass transition temperature.

(3) A method for preparing a magnetic recording medium according to (1) wherein the maximum shearing force zone is a zone where the angle included between the longitudinal axes of the major surfaces of adjacent paddles axially mounted on the rotating shafts of said twin-shaft continuous kneader ranges from 72 to 90 degrees.

(4) A method for preparing a magnetic recording medium according to (1) wherein said mixture is kneaded into a kneaded mixture having a solids concentration of 70 to 85% by weight.

OPERATION AND BENEFITS

According to the invention, a mixture containing a magnetic powder, at least one binder, and at least one organic solvent is kneaded to form a magnetic paint by passing it through a twin-shaft continuous kneader while controlling the temperature of the mixture. The mixture temperature is controlled in such a manner that the temperature may be higher than the glass transition temperature (Tg) of the binder and lower than the lowest boiling point of the organic solvent when the mixture passes through the maximum shearing force zone, and be lower than the temperature of the mixture upon its passage through the maximum shearing force zone, preferably lower than the Tg when the mixture passes through zones other than the maximum shearing force zone.

By controlling the temperature of the mixture to be higher than the Tg of the binder when the mixture passes through the maximum shearing force zone, as compared with a case wherein that temperature is not higher than Tg, the binder is increased in flow and hence, in penetration into the magnetic powder so that the dispersity of the magnetic paint components is improved even by brief kneading using a twin-shaft continuous kneader. Therefore, a magnetic recording medium prepared using such a magnetic paint has improved electromagnetic properties.

It is to be noted that the method proposed in JP-A 176020/1992 of kneading a mixture by passing it through a twin-shaft continuous kneader while keeping the mixture at a temperature higher than Tg throughout the entire passage step can improve dispersity, but is difficult to control the surface roughness of a magnetic layer, which can increase a coefficient of friction and exacerbate transport stability, often inviting a transport accident.

Accordingly, the method of the invention controls the temperature of the mixture to be lower than the temperature of the mixture upon its passage through the maximum shearing force zone, preferably lower than Tg (at least partially) when the mixture passes through zones other than the maximum shearing force zone, thereby preventing the magnetic layer of a magnetic recording medium prepared therefrom from increasing a coefficient of friction at its surface. By the preparation method involving such a temperature control, there is obtained a magnetic recording medium having good dispersity, improved electromagnetic properties, a low coefficient of friction and improved transport stability. The method for the preparation of a magnetic recording medium involving such a temperature control has never been proposed in the prior art.

ILLUSTRATIVE CONSTRUCTION

Now the illustrative construction of the invention is described in detail.

Figure 1:
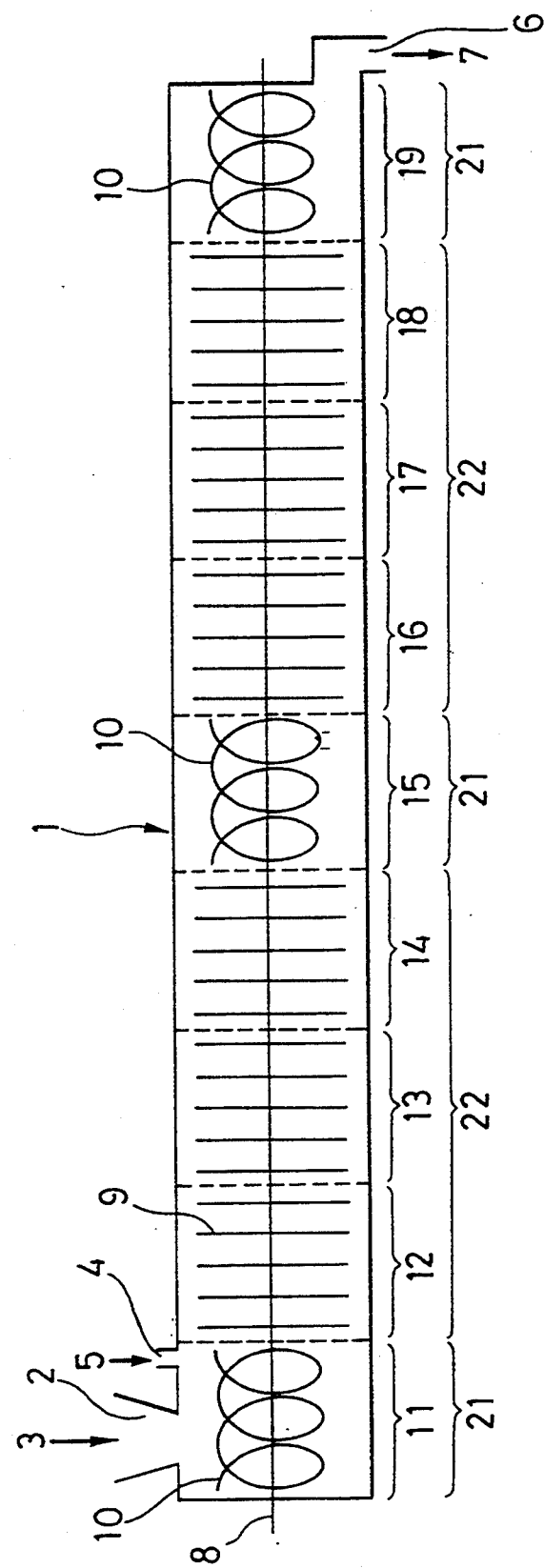
FIG. 1 schematically illustrates in axial cross-section an exemplary twin-shaft continuous kneader used in the present invention.
Figure 2:
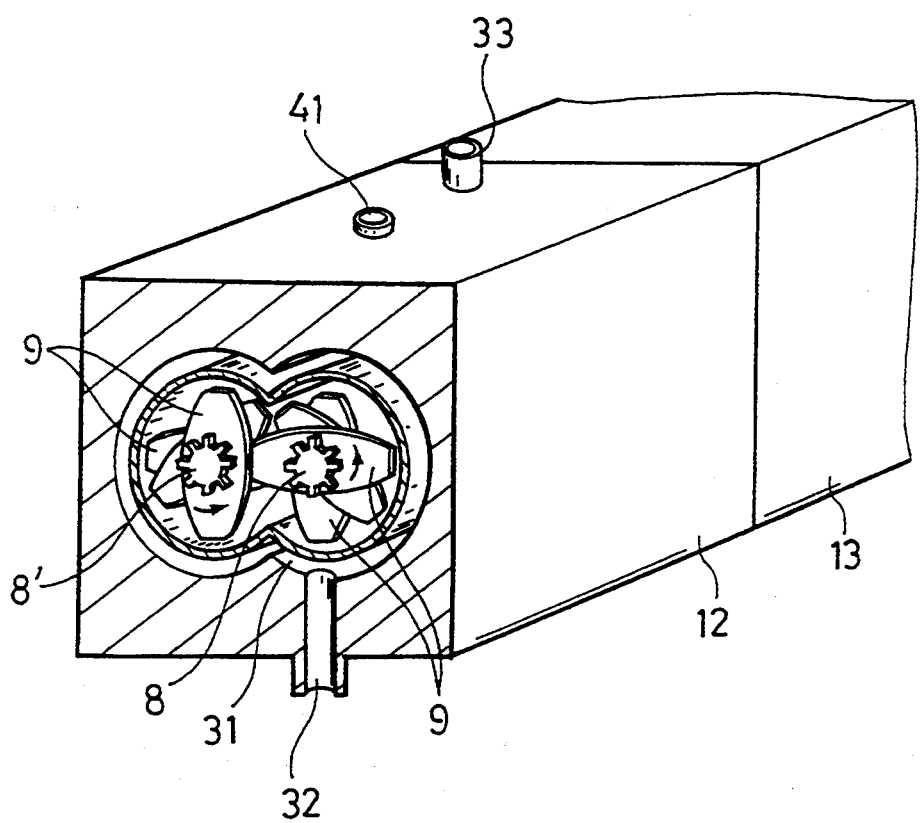
FIG. 2 is a cross-sectional perspective view of the twin-shaft continuous kneader used in the present invention.

The construction of a twin shaft continuous kneader used herein is described with reference to FIGS. 1 and 2. As shown in FIG. 1, the twin shaft continuous kneader 1 used herein has a powder inlet 2, a binder solution inlet 4, a kneaded mixture outlet 6, a rotating shaft 8, paddles 9, screws 10, barrels 11 to 19, screw sections 21, and kneading sections 22. Two rotating shafts 8 and 8' are included as best shown in FIG. 2.

Each screw section 21 includes screws 10 mounted on the rotating shafts 8, 8' and has a main function of carrying the mixture forward. Each kneading section 22 includes paddles 9 mounted on the rotating shafts 8, 8' and has main functions of kneading and carrying forward the mixture. The kneading function is to impart shearing forces to the mixture to enhance the dispersity of components. The screw and kneading sections 21 and 22 are not limited to the illustrated arrangement and may be disposed in any suitable arrangement, with their combination and length in the direction of the rotating shafts 8, 8' being arbitrary. The screw and kneading sections generally have the function of carrying the mixture in a direction from the powder inlet 2 to the kneaded mixture outlet 6 although the carrying direction may be reversed in some sections if necessary.

Figure 3:
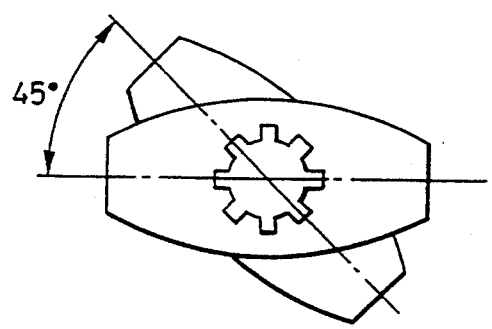
FIG. 3 is a front view of paddles set at a paddle angle of 45°.
Figure 4:
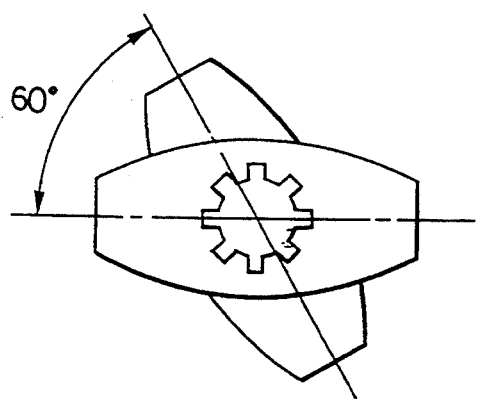
FIG. 4 is a front view of paddles set at a paddle angle of 60°.
Figure 5:
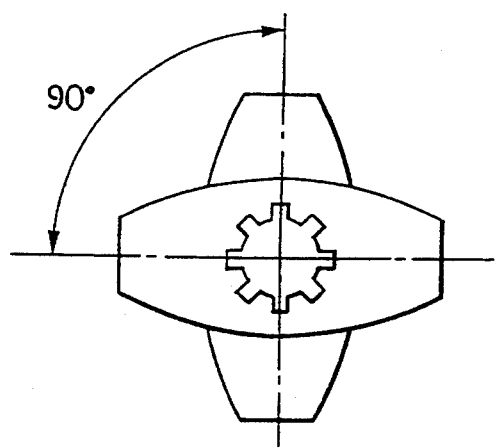
FIG. 5 is a front view of paddles set at a paddle angle of 90°.

The kneading and carrying functions of the kneading section 22 are determined by the angle between the longitudinal axes of the major surfaces of adjacent paddles 9 axially mounted on each rotating shaft 8, 8' (to be referred to as a paddle angle, hereinafter). In general, the paddle angle used herein is 30, 45, 60 and 90 degrees. For example, FIGS. 3, 4, and 5 are front views showing paddles at a paddle angle of 45°, 60°, and 90°, respectively. As the paddle angle approaches 90°, the carrying function lowers, but the shearing force applied to the mixture is increased to enhance the kneading function. As the paddle angle is more apart from 90°, the carrying function increases and the kneading function lowers. Note that the paddle angle is not limited to the above-mentioned four degrees with no particular limit imposed thereon.

Among these paddle angles, the paddle angle where the maximum shearing force is applied to the mixture ranges from 72 to 90 degrees, especially from 80 to 90 degrees. If the paddle angle is smaller than this range, the shearing force applied to the mixture lowers and the carrying function increases.

In mounting the paddles 9, usually 5 to 20 paddles are set in one group to construct a paddle block wherein the paddle angle is constant. A paddle block having a paddle angle set to apply a maximum shearing force to the mixture to mainly provide for the kneading function and another paddle block having a paddle angle outside the above-defined range to provide for both the kneading and carrying functions are combined to form the kneading section 22. It is to be noted that the paddle angle need not be identical within the paddle block, and the paddle block may be a block wherein the paddle angle is varied little by little, for example, if desired, with no particular limit in this regard.

The combination of paddle blocks in the kneading section 22 includes a paddle block or blocks intended mainly for the kneading function and a paddle block or blocks having both the kneading and carrying functions while the axial arrangement order and the axial length (that is, the number of paddles per paddle block) of the respective blocks are arbitrary and may be determined as desired. However, preferably a paddle block having both the kneading and carrying functions and a paddle block intended mainly for the kneading function are arranged within an identical kneading section 22 and more preferably, a paddle block having both the kneading and carrying functions is arranged axially upstream and a paddle block intended mainly for the kneading function is arranged axially downstream. If the kneading section 22 consists solely of a paddle block or blocks intended mainly for the kneading function, the mixture will stagnate in the kneading section 22 due to low carrying function, which tends to lower productivity and deteriorate the properties of a magnetic recording medium prepared using the mixture due to excessive kneading. Also, if the kneading section 22 consists solely of a paddle block or blocks having both the kneading and carrying functions, with no paddle block intended mainly for the kneading function, there is a likelihood that the kneaded mixture be reduced in dispersity due to low kneading function and a magnetic recording medium prepared using such a kneaded mixture would have poor electromagnetic properties.

In the twin-shaft continuous kneader 1 used herein, the corresponding paddles 9 on the two rotating shafts 8 and 8' are always disposed with a phase shift of 90 degrees such that the tip of the paddle on one shaft may rub the paddle on the other shaft at a corresponding position as shown in the cross-sectional perspective view of FIG. 2.

The temperature of the mixture passing through the twin-shaft continuous kneader 1 can be controlled by circulating water at a controlled temperature through a temperature controlling circulating water path 31 of each of the barrels 11 to 19 from a temperature controlling water inlet 32 to a temperature controlling water outlet 33. Since the temperature controlling circulating water paths 31 of the barrels 11 to 19 are independent from each other, water at different temperatures can be circulated through the respective paths 31 of the barrels so that the temperature of the mixture being passed may be controlled to a desired temperature in each of the barrels.

The temperature of circulating water is controlled by measuring the temperature of the mixture by a temperature sensor which is disposed in a temperature sensor insert opening 41 so that at least a sensor portion is in contact with the mixture, processing the temperature measurement in a control circuit (not shown), and heating or cooling the water to an appropriate temperature by means of a separate water bath or cooler. Alternatively, the temperature may be controlled in accordance with previously empirically measured circulating water temperatures. At least one temperature sensor insert opening 41 is provided in each of the barrels 11 to 19, with at least one temperature sensor located in each of the barrels 11 to 19. The temperature of the barrels may also be controlled by using organic solvents, suitable gas media or vapor, silicone oil, anti-freeze fluid instead of the circulating water or by providing the barrels with heaters or the like. There may be used any desired means for controlling the temperature of the mixture being passed through the barrels.

By such a method, the temperature of the mixture is controlled such that it may be higher than the glass transition temperature Tg of the binder(s) used, more preferably at least 1° C. higher than Tg, most preferably at least 5° C. higher than Tg, and lower than the lowest boiling point of the organic solvent(s) used, more preferably at least 10° C. lower than the boiling point when the mixture passes through the zone where a maximum shearing force is applied to the mixture, that is, the paddle block intended mainly for the kneading function.

In addition, at least partially when said mixture passes through zones other than the zone where a maximum shearing force is applied to the mixture, more preferably when said mixture passes through zones other than the maximum shearing force zone, the temperature of the mixture is controlled such that it may be lower than the temperature of the mixture upon passage through the maximum shearing force zone, more preferably lower than the Tg of the binder used, especially at least 2° C lower than Tg, most preferably at least 5° C. lower than Tg. In controlling to a temperature lower than Tg, there is no particular lower limit of temperature although the temperature of the kneaded mixture is not lower than 20° C. as a general rule. By controlling the temperature of the mixture upon passage through the twin-shaft continuous kneader 1 in this way, there is obtained a kneaded mixture which has improved dispersity and provides a magnetic layer with a low coefficient of friction at the surface when a magnetic recording medium is prepared therefrom.

If the mixture is kneaded at a temperature lower than Tg of the binder used throughout the entire process when the mixture is passed through the twin-shaft continuous kneader 1, there is a likelihood that the dispersity of magnetic powder in the kneaded mixture be deteriorated because of low penetration of the binder. If the mixture is kneaded without lowering its temperature even when it passes the zones other than the zone where a maximum shearing force is applied to the mixture, there is obtained a kneaded mixture which provides a magnetic layer with a too high coefficient of friction at the surface when a magnetic recording medium is prepared therefrom. Moreover, if the mixture is kneaded at a temperature which is too higher than the lowest boiling point of the organic solvent used, the organic solvent would vaporize to cause separation between the kneaded mixture and the solvent portion, resulting in insufficient kneading.

It should be understood that when more than one binder is used, the Tg of the binder used herein is a synthetic Tg value of such binders. The synthetic Tg value is determined as:

Synthetic Tg value=(Tg of binder A)×{(parts by weight of binder A)/(parts by weight of binder A+parts by weight of binder B)}+(Tg of binder B)×{(parts by weight of binder B)/(parts by weight of binder A+parts by weight of binder B)} when two binders A and B are used, for example.

In this specification, the lowest boiling point of the organic solvent used is when one organic solvent is used, the boiling point of that organic solvent, and when two or more organic solvents are used, the boiling point of the organic solvent which has the lowest boiling point among the solvents used.

In the practice of the invention, the kneaded mixture 7 obtained by kneading the mixture preferably has a solids concentration of 70 to 85% by weight, more preferably 72 to 83% by weight. If the solids concentration of the kneaded mixture is too high, the amount of the organic solvent is too small to facilitate penetration of the binder so that the mixture may not be fully milled, resulting in short kneading. If the solids concentration of the kneaded mixture is too low, the mixture has a too low viscosity to receive satisfactory shearing forces, also resulting in short kneading.

The solids concentration of the kneaded mixture may be calculated by the following equation.

solids concentration (% by weight)=(parts by weight of magnetic powder+parts by weight of binder)/(parts by weight of magnetic powder+parts by weight of binder+parts by weight of organic solvent)×100

It is to be noted that although the embodiment illustrated in FIG. 1 has nine barrels including the powder inlet 2 and kneaded mixture outlet 6, the number of barrels in the screw and kneading sections 21 and 22 may be increased or decreased as desired and, for example, an extra screw or kneading section 21 or 22 having a binder solution inlet 4 may be connected downstream of the barrel 19 shown in FIG. 1. With such a construction, a dilution step of adding a binder solution or an organic solvent to the kneaded mixture 7 having a solids concentration of about 70 to 85% by weight resulting from the barrel 18 to lower the solids concentration can be continuously carried out.

The kneaded mixture 7 resulting from the manufacture method of the invention contains a magnetic powder, at least one binder, and at least one organic solvent.

The magnetic powder used herein is not particularly limited insofar as it is conventionally used in coating type magnetic recording media. It may be selected for a particular purpose from well-known magnetic powders, for example, oxide fine powders such as $\gamma$-$Fe_2O_3$, cobalt-doped $\gamma$-$Fe_2O_3$, $Fe_3O_4$, cobalt-doped $Fe_3O_4$, and $CrO_2$ and Fe, Co, Ni and alloys thereof in fine powder form. Its coercivity Hc, saturated magnetization $\sigma_s$ and other properties may be suitably selected for a particular purpose.

The content of the magnetic powder may be 70 to 85 parts by weight, more preferably 73 to 83 parts by weight in the magnetic layer composition. If the content of ferromagnetic powder is too high, it is difficult to improve surface smoothness by calendering. With a too low content, no high reproduction outputs are expectable.

The binder may be a thermoplastic resin, thermosetting resin, reactive resin, electron beam-curable resin or a mixture thereof.

Examples of the thermoplastic resin used herein include vinyl chloride-acrylate copolymers, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, methacrylate-vinylidene chloride copolymers, methacrylate-ethylene copolymers, polyvinyl fluoride-vinylidene chloride-acrylonitrile copolymers, acrylonitrile-butadiene copolymers, polyamide resins, polyvinyl butyral, cellulose derivatives (e.g., cellulose acetate butyrate, cellulose diacetate, cellulose triacetate, cellulose propionate, and nitrocellulose), styrene-butadiene copolymers, polyester resinchlorovinyl ether-acrylate copolymers, amino resins, and synthetic rubber series thermoplastic resins. They may be used alone or in admixture of two or more.

Preferred among these are combinations of a vinyl chloride resin and a polyurethane resin as shown below.

Preferred vinyl chloride resins are those containing sulfur (S) as a polar group, especially a sulfate and/or sulfo group. Exemplary sulfate and sulfo groups are —$SO_4Y$ and —$SO_3Y$ wherein Y is H or an alkali metal, most preferably those wherein Y=K, that is, —$SO_4K$ and —$SO_3K$. Either one or both of the sulfate and sulfo groups may be contained and when both are contained, they are present in any desired proportion. Preferably a sulfur-containing polar group is contained in a molecule in an amount of 0.01 to 10% by weight, more preferably 0.1 to 5% by weight of sulfur atom. In addition to the S-containing polar group, the vinyl chloride resin may optionally contain another polar group such as a —$OPO_2Y$ group, —$PO_3Y$ group, and —COOY group.

The resin skeleton to which such a sulfur-containing polar group is attached is a vinyl chloride resin. The vinyl chloride resin preferably has a vinyl chloride content of 60 to 100% by weight, more preferably 60 to 95% by weight. Exemplary vinyl chloride resins include vinyl chloride-vinyl acetate-vinyl alcohol copolymers, vinyl chloride-vinyl alcohol copolymers, vinyl chloride-hydroxyalkyl (meth)acrylate copolymers, and vinyl chloride-vinyl acetate-vinyl alcohol-glycidyl (meth)acrylate copolymers, with copolymers of vinyl chloride with a monomer containing an epoxy group being preferred. They preferably have an average degree of polymerization of about 100 to about 900.

Suitable examples of the vinyl chloride resin are those disclosed in JP-A 238371/1985, 101161/1985, 235814/1985, 238306/1985, and 238309/1985. These resins are obtained by polymerizing vinyl chloride, an epoxy group-containing monomer and optionally, another copolymerizable monomer in the presence of a radical release agent having a sulfur-containing strong acid residue such as ammonium persulfate and potassium persulfate. The radical release agent is generally used in an amount of 0.3 to 9.0% by weight, preferably 1.0 to 5.0% by weight of the monomers. More particularly, since most radical release agents having a sulfur-containing strong acid residue are water soluble, emulsion polymerization, suspension polymerization using alcohols such as methanol as a polymerization medium or solution polymerization using ketones as a medium is adequate.

Upon polymerization, another radical release agent commonly used in polymerization of vinyl chloride may be used in addition to the radical release agent having a sulfur-containing strong acid residue. Such radical release agents include organic peroxides such as lauroyl peroxide, benzoyl peroxide, 3,5,5-trimethylhexanoyl peroxide, diisopropylperoxydicarbonate, di-2-ethylhexylperoxydicarbonate, di-2-ethoxyethylperoxydicarbonate, t-butyl-peroxypivalate, and t-butylperoxyneodecanoate; and azo compounds such as 2,2'-azobisisobutyronitrile, 2,2'-azobis-2,4-dimethylvaleronitrile, and 4,4'-azobis-4-cyanovaleric acid. It is also possible to combine the radical release agent having a strong acid residue with a reducing agent such as sodium formaldehydesulfoxylate, sodium sulfite, and sodium thiosulfate.

Examples of the suspension stabilizers include synthetic polymers such as polyvinyl alcohol, partially saponified polyvinyl acetate, cellulose derivatives such as methyl cellulose, hydroxypropyl cellulose, and carboxymethyl cellulose, polyvinyl pyrrolidone, polyacrylamide, maleic acid-styrene copolymers, maleic acid-methyl vinyl ether copolymers, and maleic acid-vinyl acetate copolymers and natural polymers such as starch and gelatin. Also exemplary emulsifiers include anionic emulsifiers such as sodium alkylbenzenesulfonates and sodium laurylsulfate and nonionic emulsifiers such as polyoxyethylene alkyl ethers and polyoxyethylene sorbitan fatty acid partial esters. Molecular weight modifiers such as trichloroethylene and thioglycol may be used if necessary.

Examples of the epoxy group-containing monomer include glycidyl ethers of unsaturated alcohols such as allyl glycidyl ether and methallyl glycidyl ether; glycidyl esters of unsaturated acids such as glycidyl acrylate, glycidyl methacrylate, glycidyl-p-vinylbenzoate, methylglycidyl itaconate, glycidyl ethylmaleate, glycidyl vinylsulfonate, and glycidyl (meth)allylsulfonate; and epoxide olefins such as butadiene monoxide, vinylcyclohexene monoxide, and 2-methyl-5,6-epoxyhexene. This monomer is generally used in an amount to provide at least 0.5% by weight of epoxy group in the copolymer.

Examples of the optional monomer which can be used in addition to the vinyl chloride and epoxy-containing monomer include vinyl carboxylates such as vinyl acetate and vinyl propionate; vinyl ethers such as methyl vinyl ether, isobutyl vinyl ether, and cetyl vinyl ether; vinylidenes such as vinylidene chloride and vinylidene fluoride; esters of unsaturated carboxylic acids such as diethyl maleate, butylbenzyl maleate, di-2-hydroxyethyl maleate, dimethyl itaconate, methyl (meth)acrylate, ethyl (meth)acrylate, lauryl (meth)acrylate, and 2-hydroxypropyl (meth)acrylate; olefins such as ethylene and propylene; unsaturated nitriles such as (meth)acrylonitrile; and aromatic vinyls such as styrene, α-methylstyrene and p-methylstyrene.

The thus obtained resins generally have an average degree of polymerization of 100 to 900, preferably 200 to 500 and a vinyl chloride content of at least 60% by weight. Such resins are commercially available, for example, as MR-110 from Nippon Zeon K. K.

The polyurethane resin which is used in combination with the vinyl chloride resin defined above has a sulfur or phosphorus-containing polar group. The preferred sulfur-containing group is at least one of —$SO_3Y$ (sulfonate) and —$SO_4Y$ (sulfate) groups and the preferred phosphorus-containing polar group is at least one of phosphonate groups (=PO₃Y), phosphinate groups (=PO₂Y) and phosphinous groups (=POY) wherein Y is H or an alkali metal. Among these, especially preferred Y is sodium (Na). These polar groups are preferably contained in a molecule in an amount of 0.01 to 10% by weight, 0.02 to 3% by weight calculated as atoms. The groups may be attached to the backbone or branches of the skeleton resin.

The polyurethane resins are generally obtained by reacting a hydroxyl group-containing resin with a polyisocyanate-containing compound. Examples of the hydroxyl group-containing resin include polyalkylene glycols such as polyethylene glycol, polybutylene glycol, and polypropylene glycol, alkylene oxide adducts of bisphenol-A, various glycols, and polyester polyols having a hydroxyl group at the end of a molecular chain. Preferred among these are polyurethane acrylate resins obtained from polyester polyols as one component.

The carboxylic acid components of the polyester polyols include aromatic dicarboxylic acids such as terephthalic acid, isophthalic acid, ortho-phthalic acid, and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid, and dodecanedicarboxylic acid; unsaturated fatty acids and alicyclic dicarboxylic acids such as fumaric acid, maleic acid, itaconic acid, tetrahydrophthalic acid, and hexahydrophthalic acid; and tri- and tetracarboxylic acids such as trimellitic acid, trimeric acid, and pyromellitic acid.

Also the glycol components of the polyester polyols include ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide adducts and propylene oxide adducts of bisphenol-A or the like, ethylene oxide adducts and propylene oxide adducts of hydrogenated bisphenol-A, polyethylene glycol, polypropylene glycol, and polytetramethylene glycol. Tri- and tetra-ols such as trimethylol ethane, trimethylol propane, glycerin, and pentaerythritol may be additionally used. Other useful polyester polyols are lactone series polyester diol chains obtained by ring-opening polymerization of lactones such as caprolactone.

Examples of the polyisocyanate used herein include diisocyanates such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenyl ether, 1,5'-naphthalene diisocyanate, p-xylylene diisocyanate, m-xylylene diisocyanate, 1,3-diisocyanatomethylcyclohexane, 1,4-diisocyanatomethylcyclohexane, 4,4'-diisocyanatodicyclohexane, 4,4'-diisocyanatocyclohexylmethane, and isophorone diisocyanate, as well as less than 7 mol % based on the entire isocyanato group of triisocyanate compounds such as 2,4-tolylene diisocyanate trimers and hexamethylene diisocyanate trimers.

These urethane resins may be obtained by well-known reaction methods in a solvent or solventless system using a particular polar group-containing compound and/or a source material containing a starting resin having reacted with a particular polar group-containing compound. The resulting resins desirably have a molecular weight of 500 to 100,000.

Desirably, the vinyl chloride resin having a sulfur-containing polar group and the urethane resin having a sulfur or phosphorus-containing polar group are mixed in a weight ratio of from 70:30 to 90:10. In addition to these resins, there may be contained any of well-known resins in an amount of up to 20% by weight of the entire composition.

Examples of the thermosetting resin or reactive resin include phenolic resins, epoxy resins, polyurethane curable resins, urea resins, melamine resins, alkyd resins, silicone resins, acrylic reactive resins, mixtures of a high molecular weight polyester resin and an isocyanate prepolymer, mixtures of a methacrylate salt copolymer and a diisocyanate prepolymer, urea-formaldehyde resins, and polyamine resins. They may be used alone or in admixture of two or more.

The crosslinking agents which can be used in curing the binder resin are various polyisocyanates, especially diisocyanates, with at least one of tolylene diisocyanate, hexamethylene diisocyanate and methylene diisocyanate being especially preferred. More preferably, these crosslinking agents are used as crosslinking agents modified so as to have a plurality of hydroxyl groups such as trimethylol propane or isocyanurate type crosslinking agents having three molecules of a diisocyanate compound whereby they cause the binder resin to be crosslinked by bonding with a functional group in the binder resin. The content of the crosslinking agent is preferably 10 to 30 parts by weight per 100 parts by weight of the resin. These thermosetting resins are generally cured by heating in an oven at 50° to 70° C. for 12 to 24 hours.

Also preferred as the binder are those obtained by curing electron beam-curable compounds, that is, electron beam-cured resins. Illustrative examples of the electron beam-curable compound include unsaturated prepolymers of maleic anhydride type, urethane acryl type, epoxy acryl type, polyester acryl type, polyether acryl type, polyurethane acryl type, and polyamide acryl type; and polyfunctional monomers of ether acryl type, urethane acryl type, epoxy acryl type, phosphate ester acryl type, aryl type, and hydrocarbon type. They may be used alone or in admixture of two or more.

The content of the binder in the magnetic layer is generally 1 to 200 parts by weight, especially 5 to 40 parts by weight, preferably 14 to 30 parts by weight, more preferably 15 to 25 parts by weight per 100 parts by weight of the magnetic powder. With less contents, the magnetic layer is reduced in strength to detract from dynamic durability and also reduced in calendering susceptibility to detract from electromagnetic properties. On the other hand, with too much binder contents, electromagnetic properties are also deteriorated due to low contents of the magnetic powder.

No particular limit is imposed on the organic solvent and one or more solvents may be selected for a particular purpose from conventional organic solvents, for example, ketones such as methyl ethyl ketone, methyl isobutyl ketone, acetone, and cyclohexanone and aromatic solvents such as toluene.

Additionally, the above-mentioned mixture may have further admixed therein dispersants such as surfactants, antistatic agents such as carbon black, and inorganic fine particles for increasing the mechanical strength of a magnetic layer, for example, of $\alpha$-Al$_2$O$_3$, SiO$_2$, TiO$_2$, $\alpha$-Fe$_2$O$_3$, Cr$_2$O$_3$, SiC, CaO, ZrO$_2$, SiZrO$_4$, etc.

In the practice of the manufacturing method of the invention, when the binder is admitted into the twin-shaft continuous kneader 1, it may be admitted into the powder inlet 2 together with the other powder components, but it is preferred from the standpoint of penetration of the binder into the magnetic powder that the binder is previously dissolved in an organic solvent to form a binder solution, which is supplied to the kneader. At this point, additives such as the dispersant mentioned above may be admixed into the binder solution.

These components are kneaded or milled in the abovementioned way to produce a kneaded mixture which is generally subject to a dilution step by introducing it into an extra screw or kneading section 21 or 22 additionally connected downstream of the barrel 19 as previously mentioned or by using another twin-shaft continuous kneader, dissolver, media agitating mill, ball mill, kneader, high speed agitator, narrow gap passage type dispersing machine (e.g., inline mill and tornado) and cavitation type dispersing machine (e.g., nanomizer) alone or in combination of two or more. By such a treatment to dilute the mixture to a solids concentration appropriate as a magnetic paint to be applied to a non-magnetic substrate, there is obtained a magnetic paint. During this dilution step, a lubricant, a crosslinking agent and other additives which are optionally added to magnetic paint may also be added to and dispersed in the magnetic paint.

The thus obtained magnetic paint is coated on a non-magnetic substrate by a conventional method to form a magnetic layer, which is subject to optional orientation, drying, calendering, curing and cutting before a magnetic recording medium is obtained. The medium may take any conventional construction as desired, by forming a magnetic layer of a multi-layer structure, providing an undercoat layer between the magnetic layer and the non-magnetic substrate, or providing a backcoat layer if desired.

EXAMPLES

Examples of the invention are given below by way of illustration. Unless otherwise stated, all "parts" are parts by weight.

Example 1

Kneading was continuously carried out by feeding 100 parts of a ferromagnetic metal powder ($\sigma_s$: 150 emu/g, Hc: 1620 Oe, BET value: 61 m$^2$/g) through the powder inlet 2 and admitting a binder solution of the formulation shown below through the binder solution inlet 4 by means of a metering pump. The ferromagnetic metal powder 3 was handled in a nitrogen atmosphere throughout the process and the interior of the twin-shaft continuous kneader 1 was entirely kept in a nitrogen stream.

| [Formulation of binder solution] | |
| --- | --- |
| MR-110 (manufactured by Nippon Zeon K.K., Tg = 59° C.) | 8.6 parts |
| UR-8300 (manufactured by Toyobo K.K., Tg = 20° C.) | 5.7 parts |
| Methyl ethyl ketone (b.p. = 79.6° C.) | 20 parts |
| Toluene (b.p. = 110.6° C.) | 14 parts |
| Phosphate dispersant | 3 parts |

The twin-shaft continuous kneader 1 was of the arrangement shown in the schematic view of FIG. 1 wherein paddle blocks having a paddle angle of 45° were disposed in the barrels 12 and 16, a paddle block having a paddle angle of 60° was disposed in the barrel 13, and paddle blocks having a paddle angle of 90° were disposed in the barrels 14, 17 and 19 along the kneader shafts 8, 8'. The temperature of the mixture upon passage of the respective barrels was controlled to the temperatures shown in Table 1 by circulating water at appropriate temperature through the temperature controlling circulating water paths of the respective barrels 12 to 18.

Note that the binders used had a synthetic Tg value of 43.4° C.

The kneaded mixture outlet 6 discharged a kneaded mixture 7 having a solids concentration of 77.1% by weight, which was subject to dilution by mixing it with the following dilution composition A in a dissolver, obtaining a kneaded dilution a having a solids concentration of 42.1% by weight.

| [Formulation of dilution composition A] | |
| --- | --- |
| $\alpha$-Al$_2$O$_3$ | 10 parts |
| MR-110 | 2.4 parts |
| UR-8300 | 1.5 parts |
| Methyl ethyl ketone | 51 parts |
| Toluene | 57 parts |
| Cyclohexanone | 36 parts |
| Antistatic agent (carbon black) | 1 part |

The kneaded dilution a having a solids concentration of 42.1% by weight was subject to dispersion in a media agitating mill, obtaining a kneaded dilution b.

The following dilution composition B was added to the kneaded dilution b, which was mixed and dispersed in a media agitation mill, obtaining a magnetic paint having a solids concentration of 30% by weight.

| [Formulation of dilution composition B] | |
| --- | --- |
| Stearic acid | 1 part |
| Butyl stearate | 1 part |
| Methyl ethyl ketone | 50 parts |
| Toluene | 50 parts |
| Cyclohexanone | 25 parts |
| Polyisocyanate | 4 parts |

By applying the resulting magnetic paint to a non-magnetic substrate of polyethylene terephthalate, subjecting the coating to orientation, drying and calendering, forming a backcoat layer, effecting curing treatment, and cutting to a width of ½ inch and 8 mm, magnetic recording media in the form of magnetic tape were obtained.

The magnetic tapes were measured for a coefficient of dynamic friction and electromagnetic properties by the following methods.

Coefficient of dynamic friction

The magnetic tape of ½ inch wide was used. A friction tester was operated to transport the tape while it was wrapped around a VCR cylinder over an angle of 180 degrees. A coefficient of dynamic friction was determined from the tension measurements upstream and downstream of the cylinder according to Euler's equation of motion. The transport speed was 0.5 cm/sec. and the back tension was 20 g per tape width.

Electromagnetic properties

The magnetic tape of 8 mm wide was used. Using EV-S900 manufactured by Sony Corporation, RF-OUT (7 MHz), C-OUT, and C/N (7 MHz/5 MHz) were measured by a conventional procedure in the SP mode.

The temperature measurements of the mixture upon passage of the respective barrels are shown in Table 1 together with the measurements of a coefficient of dynamic friction and electromagnetic properties of the resultant magnetic recording media.

controlled as shown in Table 1, and the amounts of organic solvents in the formulations of the binder solution and dilution composition A were changed from the amounts used in Example 1 to the following amounts.

|  | Example 4 | Example 5 |
|---|---|---|
| [Amounts of organic solvents in the changed formulation of binder solution] | | |
| Methyl ethyl ketone | 26 parts | 15 parts |
| Toluene | 17 parts | 10 parts |

TABLE 1

| | Solids concentration during kneading (wt %) | Mixture temperature (°C.) Barrel No. | | | | | | | | | RF-OUT (7 MHz) | C-OUT | Electromagnetic properties C/N (7 MHz/5 MHz) | Coefficient of dynamic friction |
|---|---|---|---|---|---|---|---|---|---|---|---|---|---|---|
| | | 11 | 12 | 13 | 14 | 15 | 16 | 17 | 18 | 19 | | | | |
| Example | | | | | | | | | | | | | | |
| 1 | 77.1 | 25 | 32 | 40 | 46 | 30 | 38 | 45 | 46 | 29 | +0.3 | +0.5 | +1.1 | 0.40 |
| 2 | 77.1 | 25 | 33 | 41 | 50 | 31 | 38 | 51 | 51 | 30 | +0.4 | +0.5 | +1.2 | 0.40 |
| 3 | 77.1 | 25 | 33 | 40 | 54 | 32 | 38 | 55 | 56 | 30 | +0.4 | +0.6 | +1.4 | 0.40 |
| Comparative Example 1 | 77.1 | 25 | 45 | 50 | 50 | 50 | 51 | 52 | 52 | 30 | +0.4 | +0.5 | +1.3 | (0.51) |
| Comparative Example 2 | 77.1 | 25 | 25 | 35 | 35 | 34 | 35 | 38 | 38 | 29 | −1.3 | +0.1 | −0.8 | 0.36 |
| Comparative Example 3 | 77.1 | 25 | 45 | 60 | 80 | 57 | 68 | 80 | 81 | 38 | −1.0 | −0.2 | −1.1 | 0.40 |
| Example 4 | 72.6 | 25 | 33 | 40 | 52 | 32 | 37 | 50 | 55 | 31 | +0.4 | +0.4 | +1.0 | 0.40 |
| Example 5 | 82.1 | 25 | 34 | 41 | 51 | 34 | 39 | 51 | 54 | 30 | +0.3 | +0.6 | +0.9 | 0.38 |
| Comparative Example 4 | 66.3 | 25 | 33 | 41 | 53 | 33 | 39 | 53 | 54 | 31 | −0.9 | −0.7 | −0.9 | 0.41 |

Examples 2 and 3

Magnetic tapes of ½ inch and 8 mm wide were prepared under the same conditions as in Example 1 except that the temperature of the mixture upon passage of the respective barrels was controlled as shown in Table 1. The magnetic tapes were measured for a coefficient of dynamic friction and electromagnetic properties as in Example 1.

The temperature measurements of the mixture upon passage of the respective barrels are shown in Table 1 together with the measurements of a coefficient of dynamic friction and electromagnetic properties of the resultant magnetic recording media.

Comparative Examples 1–3

Magnetic tapes of ½ inch and 8 mm wide were prepared under the same conditions as in Example 1 except that the temperature of the mixture upon passage of the respective barrels was controlled as shown in Table 1. The magnetic tapes were measured for a coefficient of dynamic friction and electromagnetic properties as in Example 1.

The temperature measurements of the mixture upon passage of the respective barrels are shown in Table 1 together with the measurements of a coefficient of dynamic friction and electromagnetic properties of the resultant magnetic recording media. It is to be noted that a coefficient of dynamic friction was unmeasurable on the ½ inch wide magnetic tape obtained in Comparative Example 1 because the tape stuck to the VCR cylinder to inhibit movement at the start of measurement of a coefficient of dynamic friction. The tape stuck to the cylinder was manually stripped therefrom and transported for measurement, finding a coefficient of dynamic friction of 0.51.

Examples 4 and 5

Magnetic tapes of ½ inch and 8 mm wide were prepared as in Example 1 except that the temperature of the mixture upon passage of the respective barrels was

| [Amounts of organic solvents in the changed formulation of dilution composition A] | | |
|---|---|---|
| Methyl ethyl ketone | 45 parts | 56 parts |
| Toluene | 54 parts | 61 parts |

The resulting kneaded mixture 7 had a solids concentration of 72.6% by weight in Example 4 and 82.1% by weight in Example 5. The magnetic tapes were measured for a coefficient of dynamic friction and electromagnetic properties as in Example 1.

The temperature measurements of the mixture upon passage of the respective barrels are shown in Table 1 together with the measurements of a coefficient of dynamic friction and electromagnetic properties of the resultant magnetic recording media.

Comparative Example 4

Magnetic tapes of ½ inch and 8 mm wide were prepared as in Example 1 except that the temperature of the mixture upon passage of the respective barrels was controlled as shown in Table 1, and the amounts of organic solvents in the formulations of the binder solution and dilution composition A were changed from the amounts used in Example 1 to the following amounts.

| | Comparative Example 4 |
|---|---|
| [Amounts of organic solvents in the changed formulation of binder solution] | |
| Methyl ethyl ketone | 35 parts |
| Toluene | 23 parts |
| [Amounts of organic solvents in the changed formulation of dilution composition A] | |
| Methyl ethyl ketone | 36 parts |
| Toluene | 48 parts |

The resulting kneaded mixture 7 had a solids concentration of 66.3% by weight. The magnetic tapes were measured for a coefficient of dynamic friction and electromagnetic properties as in Example 1.

The temperature measurements of the mixture upon passage of the respective barrels are shown in Table 1 together with the measurements of a coefficient of dynamic friction and electromagnetic properties of the resultant magnetic recording media.

Figure 6:
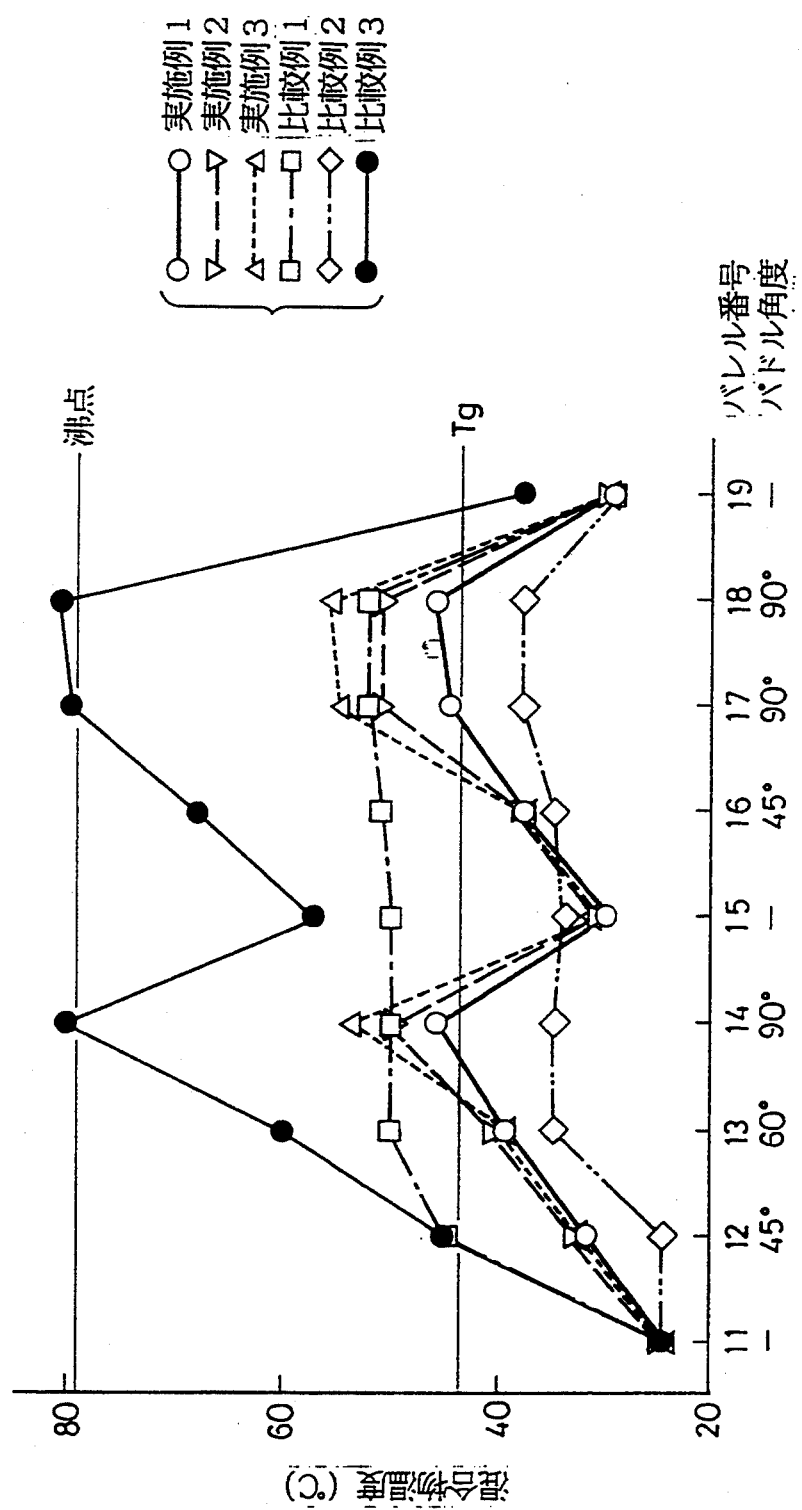
FIG. 6 is a graph showing the synthetic Tg value of the binders used, the lowest boiling point of the organic solvents used, the paddle angles of paddle blocks mounted at positions corresponding to the respective barrels, and the temperature of the mixture upon passage of the respective barrels.

With respect to Examples 1-3 and Comparative Examples 1-3 wherein the temperature of the mixture was changed upon passage of the respective barrels, the graph of FIG. 6 shows the temperature measurements of the mixture upon passage of the respective barrels, the paddle angles of paddle blocks mounted to the rotating shafts 8, 8' at positions corresponding to the respective barrels, the synthetic Tg value of the binders used and the lowest boiling temperature of the organic solvents. It is understood that screws were mounted to the rotating shafts at positions corresponding to barrel Nos. 11, 15 and 19.

As is evident from Table 1 and FIG. 6, there are obtained magnetic recording media which are improved in both electromagnetic properties and coefficient of dynamic friction as long as the controlled temperature of the mixture upon passage of the respective barrels is within the scope of the invention. In contrast, Comparative Example 1 wherein the temperature of the mixture upon passage of the barrels was always above Tg gave a high coefficient of dynamic friction. Comparative Example 2 wherein the temperature of the mixture upon passage of the barrels was always below Tg and Comparative Example 3 wherein the mixture's temperature was controlled in some zones to be higher than the lowest boiling point of the organic solvents showed poor electromagnetic properties.

It is also seen that Comparative Example 4 wherein the solids concentration was outside the scope of the invention showed poor electromagnetic properties.

We claim:

1. A method for preparing a magnetic recording medium by passing a mixture containing a magnetic powder, at least one binder, and at least one organic solvent through a twin-shaft continuous kneader for kneading to form a magnetic paint and coating a substrate with the magnetic paint, the shearing force applied to said mixture being passed through said twin-shaft continuous kneader is varied, and the temperature of said mixture is controlled to be higher than the glass transition temperature of said at least one binder and lower than the lowest boiling point of said at least one organic solvent when said mixture passes through the zone of a maximum shearing force, and the temperature of said mixture is controlled to be lower than the temperature of said mixture upon its passage through the maximum shearing force zone at least partially when said mixture passes through zones other than the maximum shearing force zone.

2. A method for preparing a magnetic recording medium according to claim 1 wherein the temperature lower than the temperature of said mixture upon its passage through the maximum shearing force zone is lower than said glass transition temperature.

3. A method for preparing a magnetic recording medium according to claim 1 wherein the maximum shearing force zone is a zone where the angle included between the longitudinal axes of the major surfaces of adjacent paddles axially mounted on the rotating shafts of said twin-shaft continuous kneader ranges from 72 to 90 degrees.

4. A method for preparing a magnetic recording medium according to claim 1 wherein said mixture is kneaded into a kneaded mixture having a solids concentration of 70 to 85% by weight.

* * * * *